United States Patent [19]

Picone et al.

[11] Patent Number: 4,658,652
[45] Date of Patent: Apr. 21, 1987

[54] ELECTROMAGNETIC FLOWMETER WITH CAPACITANCE TYPE ELECTRODES

[75] Inventors: Thomas L. Picone, Holland; Robert J. Augustine, Willow Grove, both of Pa.; Eggert Appel, Dransfeld, Fed. Rep. of Germany

[73] Assignee: Fischer & Porter Co., Warminster, Pa.

[21] Appl. No.: 829,302

[22] Filed: Feb. 14, 1986

[51] Int. Cl.$^4$ .............................................. G01F 1/58
[52] U.S. Cl. ................................ 73/861.12; 73/861.14
[58] Field of Search ............ 73/861.12, 861.14, 861.16, 73/861.17

[56] References Cited

U.S. PATENT DOCUMENTS 3,839,912 10/1974 Schmoock et al. ............... 73/861.12
4,539,853 9/1985 Appel et al. ...................... 73/861.12

Primary Examiner—Charles A. Ruehl
Attorney, Agent, or Firm—Michael Ebert

[57] ABSTRACT

A magnetic flowmeter which includes a spool formed by a metallizable ceramic whose dielectric constant is at least 25 through which the fluid to be metered is conducted. The outer surface of the spool is metallized in its central region to define a pair of capacitative metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode.

8 Claims, 6 Drawing Figures

ELECTROMAGNETIC FLOWMETER WITH CAPACITANCE TYPE ELECTRODES

BACKGROUND OF INVENTION

1. Field of Invention

This invention relates generally to magnetic flowmeters, and more particularly to a flowmeter of this type which includes a ceramic flow tube or spool through which the fluid to be metered is conducted, the ceramic spool being metallized to define the measuring and shield electrodes of the flowmeter.

2. Prior Art

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube or spool through which the fluid to be metered is conducted and to the transverse axis along which the measuring electrodes are located at diametrically-opposed positions with respect to the spool. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

In the Appel U.S. Pat. No. 4,019,366 and in the Schmoock U.S. Pat. No. 4,098,118, instead of small area measuring electrodes in direct contact with the fluid being metered, use is made of electrode assemblies encapsulated in insulation material. Each assembly is formed by a measuring electrode having a large area behind which is a driven shielding electrode of even greater area, the measuring electrodes being isolated from the fluid by a layer of insulation. Each measuring electrode forms one plate of a capacitor whose dielectric is the insulation layer and whose other plate is the fluid, the electrodes acting as a capacitance sensor to detect the voltage induced in the fluid.

A capacitance electrode sensor of this type obviates slurry and galvanic noise problems and is not subject to leakage. Also among the advantages of a capacitance sensor over contact electrodes in a magnetic flowmeter are that the conductivity range of the fluid to be metered may extend down to as low as 0.1 $\mu$S/cm or less, and one may use ordinary metals for the electrodes rather than special materials capable of withstanding the adverse effects of corrosive or abrasive fluids in contact with the electrodes.

In the co-pending applications of Appel, et al. Ser. No. 625,205 filed June 27, 1984, Pat. No. 4,539,853, whose entire disclosure is incorporated herein by reference that is disclosed in a magnetic flowmeter which includes a spool formed by a metallizable ceramic through which the fluid to be metered is conducted. The outer surface of the spool is metallized in its central region to define a pair of capacitative metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode.

In this Appel et al. arrangement, the ceramic spool is fabricated of aluminum oxide (alumina). This material has a consistent dielectric constant and high resistivity over the broad range of temperatures encountered in flowmeter operations. Alumina also has excellent abrasion and corrosion resistance and thereby can be used with corrosive fluids as well as those which the flow signal must be measured. Each electrode forms one plate of a capacitor whose dielectric is the ceramic on which it is plated and whose other plate is the fluid being metered. Hence the flow signal is measured through a pair of capacitors located in the body of the alumina spool. The smaller the capacitance values of these capacitors, the higher is the resultant electrical impedance.

Since alumina has a dielectric constant of 9, the capacitance of the two electrode capacitors is quite low. The resultant high impedance creates problems in sensing the flow signal induced in the fluid and picked up by the electrodes. As a consequence, it becomes necessary to use relatively complex and expensive pre-amplifier and amplifier stages. And since the amount of noise coming from the pre-amplifiers is a function of their source input impedance, the noise level in this prior arrangement is relatively high and gives rise to difficulties in distinguishing between the flow signal and the noise to provide accurate flow rate readings.

SUMMARY OF INVENTION

In view of the foregoing, the main object of this invention is to provide a magnetic flowmeter having a metering spool formed of a metallizable ceramic possessing a much higher dielectric constant than alumina, metering electrodes being metallized on the outer surface of the spool to define capacitative electrodes.

A significant feature of the invention is that the flow signal is measured through a pair of electrode capacitors having a high capacitance value to afford a relatively low source impedance.

Also an object of the invention is to provide a flowmeter which, because it presents a low source impedance to an associated preamplifier, makes possible a substantially noisefree signal output.

Briefly stated, these objects are attained in a magnetic flowmeter which includes a spool formed by a metallizable ceramic whose dielectric constant is at least 25 through which the fluid to be metered is conducted. The outer surface of the spool is metallized in its central region to define a pair of capacitative metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
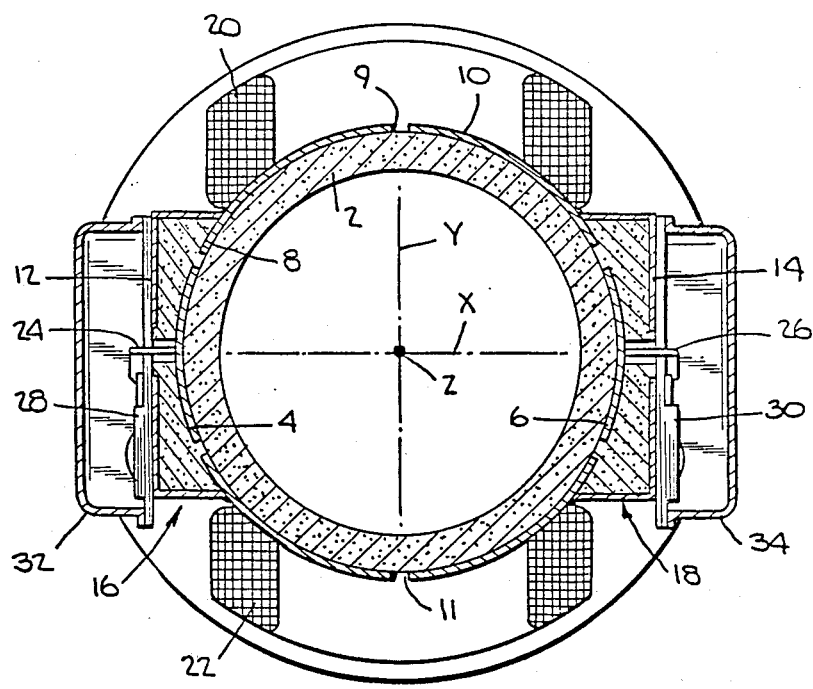
FIG. 1 is a transverse section taken through a magnetic flowmeter in accordance with the invention.
Figure 3:
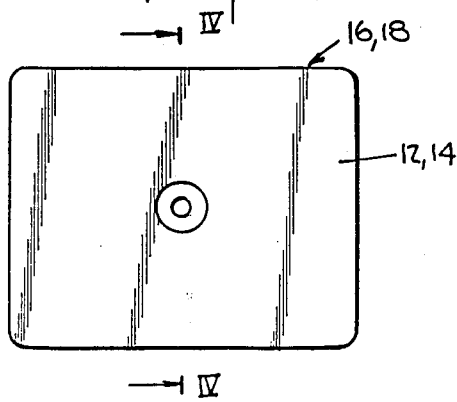
FIG. 3 is a plan view of the block for supporting the shield electrode.
Figure 4:
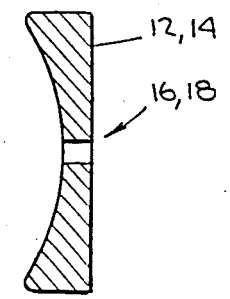
FIG. 4 is a section taken through the block shown in FIG. 3 on the plane indicated by line IV—IV therein.
Figure 2:
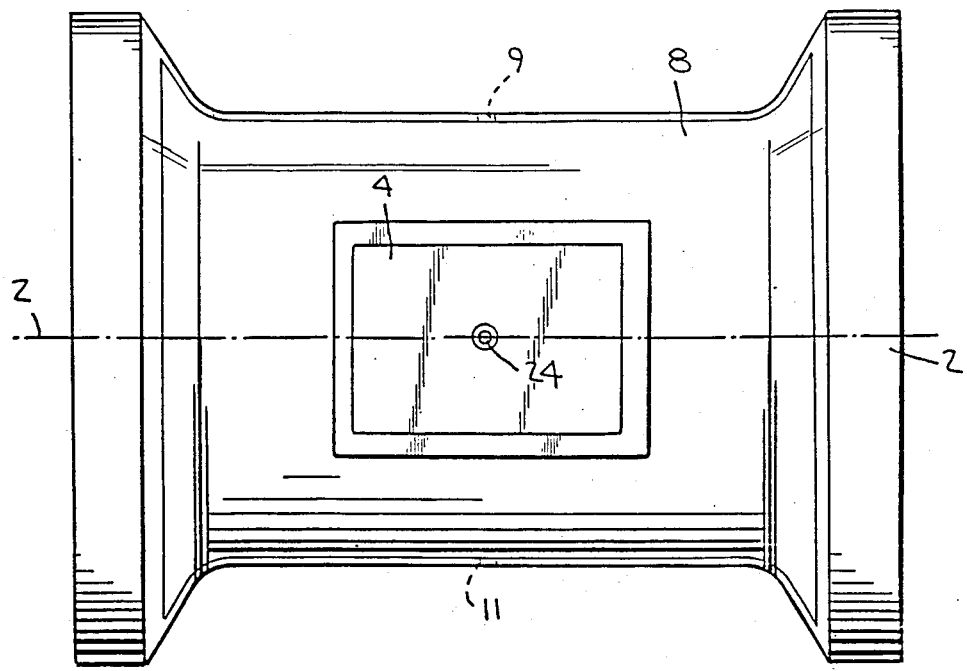
FIG. 2 is a side view of the flowmeter omitting the block for the shield electrode, thereby exposing the measuring electrode.
Figure 5:
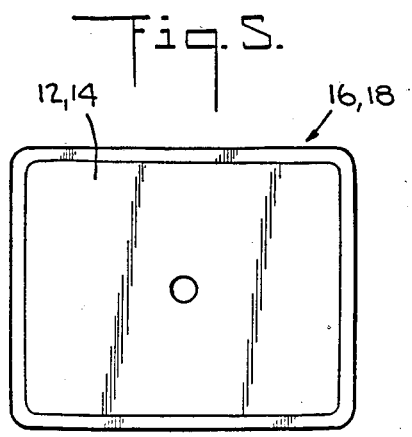
FIG. 5 is an inner view of the shield block of FIG. 3.
Figure 6:
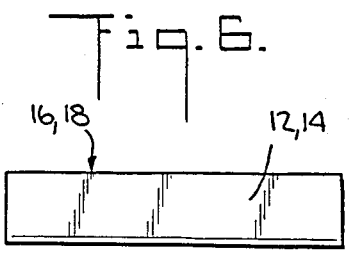
FIG. 6 is a side view of the shield block.

Referring now to the figures, a magnetic flowmeter according to the invention includes a cylindrical metering spool 2 having end flanges of enlarged diameter. The spool is formed of a metallizable ceramic having a high dielectric constant, good electrical insulating properties and sufficient structural strength for its intended purpose.

The dielectric constant of a ceramic material is determined by the ratio of the capacitance of a capacitor using this material as its dielectric to that of the same capacitor having only a vacuum as its dielectric. The dielectric constant of alumina is 9. As previously explained, when alumina is used to form a ceramic metering spool in the manner disclosed in the above-identified copending Appel et al. application, the resultant electrode capacitance gives rise to a high impedance and its attendant difficulties.

In a meter in accordance with the invention, use is made of a metallizable ceramic whose structural properties satisfy the requirements of the meter and whose dielectric constant is at least 25 and is therefore much higher than that of alumina. As a consequence, the electrode impedance is much lower.

A preferred ceramic material is titanium dioxide ($T_iO_2$) or titania, whose dielectric constant lies in the range of 140 to 160 and therefore provides, in the context of the present invention, electrode capacitors having a much higher capacitance value than that produced when using a alumina for the ceramic spool.

Also usable as a ceramic for the spool is partially stabilized zirconium oxide or zirconia ($Z_rO_3$). In its unstabilized form, this material is useful in the production of piezoelectric crystals and ceramic glazes, and when stabilized with $C_aO$ it is usable as a refractory furnace lining. In its partially stabilized form (PSZ), zirconia has a dielectric constant of about 25.

A pair of non-magnetic metering electrodes 4 and 6 are metallized, as by vacuum deposition, on the outer surface of spool 2 in the central region thereof at diametrically opposed positions. Metering electrodes 4 and 6 which conform to the curvature of the spool and have a rectangular form, are symmetrically disposed with respect to the electrode axis X which is normal to the longitudinal flow axis Z of the spool. A pair of electromagnetic field coils 20 and 22 are mounted on the outer surface of the spool at diametrically opposed positions thereon, these coils being symmetrically disposed with respect to the coil axis Y which is mutually perpendicular to axes X and Z.

Also metallized on the outer surface of spool 2 in the area which surrounds the metering electrodes 4 and 6 are symmetrically disposed shielding regions 8 and 10, these being separated by diametrically-opposed gaps 9 and 11.

Covering the pair of metering electrodes 4 and 6 and projecting from the spool are a pair of blocks 16 and 18, respectively, each provided with a concave inner surface to conform to the curvature of the spool, the blocks being formed of the same metallizable ceramic material as is used to form the spool. The surface of blocks 16 and 18 are metallized to define shield electrodes 12 and 14, respectively. The edges of these shield electrodes 12 and 14 are soldered to shield regions 8 and 10.

Supported on the outer faces of blocks 16 and 18 are impedance converters 28 and 30, respectively. These are connected to metering electrodes 4 and 6 by leads 24 and 26 which go through an opening in the center of shield electrodes 12 and 14 and pass through the ceramic blocks.

The impedance converters or pre-amplifiers 28 and 30, which are preferably constructed of a hybrid module, are housed within metal shield cups 32 and 34, respectively, whose edges are soldered to the corresponding regions in the metallized shields 12 and 14 on blocks 16 and 18.

Thus in the magnetic flowmeter arrangement in accordance with the invention, the metering electrodes are almost entirely covered by shield electrodes on the exterior of the spool. Since the electrodes are metallized, they have a negligible thickness which may be less than $10\mu$. Hence the electrodes do not interfere with the function of the electromagnetic field coils. The invention makes it possible to reduce the stray capacitance of the metering electrodes to less than 0.5% of the electrode coupling capacitance While one may effect a connection between the elements of the shielding electrodes by pressing them together, the use of soldering to bring about this connection is preferred. And by mounting the preamplifiers or impedance converters within the shield cups on the block covering the metering electrodes, one thereby eliminates a source of microphonics that otherwise would result from a cable connection to these amplifiers.

Because the spool is made of a ceramic having a high dielectric constant and the source impedance established by the electrode capacitors is relatively low, the associated electronic amplifier circuits to derive the flow signal from the electrodes become much less complex and expensive than in the case of a high impedance source. And since the amount of noise coming out of the preamplifiers is a function of their imput impedance (essentially electrode to fluid capacitance), much less noise is generated with the low source input impedance. Hence, the meter's final output is relatively quiet and the signal representing flow rates is clean and free of disturbances which adversely affect the accuracy of the reading.

Moreover, loading due to extraneous capacitance is significantly reduced, thereby minimizing a possible source of error. And the meter, due to its lower source impedance which renders, it less susceptible to electrostatic pickup, will exhibit improved zero stability.

Thus, an arrangement in accordance with the invention provides a compact and substantially noise-free magnetic flowmeter which operates efficiently to provide accurate flow rate readings.

While there has been shown and described a preferred embodiment of ELECTROMAGNETIC FLOWMETERS WITH CAPACITANCE TYPE ELECTRODES in accordance with the invention, it will be appreciated that many changes and modifications may be made therein without, however, departing from the essential spirit thereof. Thus, instead of creating the electrodes by metallizing the outer surface of the ceramic spool, the electrodes can be in the form of metal foil wrapped about and bonded to the outer surface of the spool, or it can take the form of a metallized sheet of plastic film material bonded to the outer surface of the spool, in which case there will be slight spaces between the electrode plane and the outer surface. Or the metal electrode can be embedded in the spool. But in all such alternative electrode arrangements, there is a dielectric ceramic layer interposed between the electrode and the fluid to form a capacitance.

We claim:
1. A magnetic flowmeter comprising:
   A. a spool of ceramic material having a dielectric constant of at least 25 through which is flowable the fluid to be metered;
   B. a pair of metering electrodes adjacent to or on the outer surface of the spool at diametrically-opposed positions on an electrode axis that is normal to the flow axis of the spool;
   C. a pair of electromagnetic coils disposed on the exterior of the spool at diametrically-opposed positions on a coil axis that is normal both to the electrode axis and the flow axis to produce an electromagnetic field in the spool which is intercepted by the fluid to induce an emf therein to produce a flow signal at the metering electrodes which is a function of flow rate, each electrode forming one plate of a capacitor whose dielectric is the ceramic material and whose other plate is the fluid, whereby the flow signal is measured through two electrode capacitors of relatively high capacitance value to provide a relatively low source impedance; and
   D. amplifying means coupled to said electrodes, said source impedance being the input impedance of said amplifying means to provide a signal output which is relatively noise free.

2. A flowmeter as set forth in claim 1, wherein said ceramic material is metallized and said electrodes are metallized on the outer surface of the spool.

3. A flowmeter as set forth in claim 2, further including a block of metallizable ceramic of the same material as the spool ceramic overlying each metering electrode and projecting from the spool, the outer surface of said block being metallized to define a shield electrode which covers the metering electrode.

4. A magnetic flowmeter as set forth in claim 2, wherein the outer area of the flow tube which surrounds the metering electrodes is metallized to define a pair of symmetrical shielding regions.

5. A flowmeter as set forth in claim 3, wherein said shielding regions are provided with a pair of diametrically-opposed gaps.

6. A flowmeter as set forth in claim 3, wherein the edges of the metallized shield electrodes are soldered to the related metallized shielding region.

7. A flowmeter as set forth in claim 1, wherein said ceramic is titanium dioxide.

8. A flowmeter as set forth in claim 1, wherein said ceramic is partially stabilized zirconium oxide.

* * * * *